(12) United States Patent
Cook

(10) Patent No.: US 12,038,609 B2
(45) Date of Patent: Jul. 16, 2024

(54) DIFFRACTION GRATING RETURN MIRROR FOR WIDE FIELD OF VIEW LINE OF SIGHT JITTER SENSING

(71) Applicant: Raytheon Company, Waltham, MA (US)

(72) Inventor: Lacy G. Cook, El Segundo, CA (US)

(73) Assignee: Raytheon Company, Tewksbury, MA (US)

(*) Notice: Subject to any disclaimer, the term of this patent is extended or adjusted under 35 U.S.C. 154(b) by 502 days.

(21) Appl. No.: 17/467,165

(22) Filed: Sep. 3, 2021

(65) Prior Publication Data

US 2023/0073153 A1  Mar. 9, 2023

(51) Int. Cl.
*G02B 6/293* (2006.01)
*G02B 6/02* (2006.01)
*H04N 23/68* (2023.01)

(52) U.S. Cl.
CPC ..... *G02B 6/29304* (2013.01); *G02B 6/02257* (2013.01); *G02B 6/29301* (2013.01); *H04N 23/68* (2023.01)

(58) Field of Classification Search
CPC .. H04N 23/6811; H04N 23/68; G02B 27/646; G02B 6/29304; G02B 6/02257; G02B 6/29301
See application file for complete search history.

(56) References Cited

U.S. PATENT DOCUMENTS

| | | | | |
|---|---|---|---|---|
| 8,218,032 B2* | 7/2012 | Nagashima | ............ | H04N 23/68 348/43 |
| 2009/0179993 A1* | 7/2009 | Presura | ................... | H04N 23/68 348/208.1 |
| 2011/0141309 A1* | 6/2011 | Nagashima | .......... | H04N 25/134 348/222.1 |

* cited by examiner

*Primary Examiner* — Nicholas G Giles

(57) ABSTRACT

An optical sensor comprises foreoptics configured to receive an image signal, an image optic operable to focus the image signal, at least one focal plane array (FPA) configured to detect the image signal, and a jitter stabilization system. The jitter stabilization system can comprise a transmitter configured to transmit a jitter source signal to the foreoptics and a position sensor configured to receive a jitter return signal. The position sensor can be positioned at a shared focus with the at least one FPA. The optical sensor further comprises a diffraction grating operable to reflect and diffract at least a portion of the jitter source signal. The jitter return signal received at the position sensor comprises at least a portion of the reflected and diffracted jitter source signal.

23 Claims, 5 Drawing Sheets

DIFFRACTION GRATING RETURN MIRROR FOR WIDE FIELD OF VIEW LINE OF SIGHT JITTER SENSING

BACKGROUND

Optical sensors are widely used to process images of surrounding environments. Various implementations of such sensors include on ground vehicles, helicopters, and space craft, just to name a few. Undesirable induced movement of the optical sensors (e.g., those due to vibrations) can result in the processed images appearing blurry. As a result, there is a fundamental controls issue that which must be overcome to reduce image blur. This requires some measurement of the image blur (e.g. a jitter measurement), a calculation for fixing the inaccuracy, and an adjustment to the system to compensate for the inaccuracy.

Various systems and methods have been implemented to remove image blur. For example, some cameras include an inertial measurement system, the camera making a correction to its image based on the inertial measurement to account for jitter. While this, and other methods, can be effective for certain systems, it can prove to be impractical and inaccurate for high performance imaging and tracking sensors where any inaccuracy in the jitter measurement (the first step in removing the image blur) can be significant. Therefore, there is a need for a system and method for accurately tracking jitter in a high performance optical sensor which can be relied on to control image jitter.

In certain optical sensor configurations, it is desirable to move a smaller field of view (FOV), formed by an imaging focal plane array (FPA) and an imager optic, around inside a larger FOV contained in an afocal foreoptics assembly. This FOV motion is usually performed by the operation of a planar internal pointing or scanning mirror located between the imager optic and the afocal foreoptics assembly. Additionally, in such optical sensors, it is desirable to measure and correct line of sight (LOS) jitter using a double pass optical beam composed of a jitter source and a jitter sensing FPA as part of a jitter stabilization system, both located in the imager optic (ideally conjugate to the imaging FPA), and a return mirror located in the outermost portion of the afocal foreoptics assembly. This type of a sensor is described in U.S. patent application Ser. No. 17/064,941 which was filed on Oct. 7, 2020, the contents of which are hereby incorporated by reference. In this manner, any perturbations in the LOS caused by the undesired motion of any optical element can be sensed and quickly corrected by a pointing motion of the internal pointing or scanning mirror.

Problems and limitations can arise when the desired pointing motion is large, such that the return mirror, if it is planar, reflects and returns the signal (i.e., beam) used to sense jitter at an angle that can be outside the FOV of the imager optic and the jitter sensing FPA. Thus, there would be no useful jitter return signal that can be used to correct the LOS jitter.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
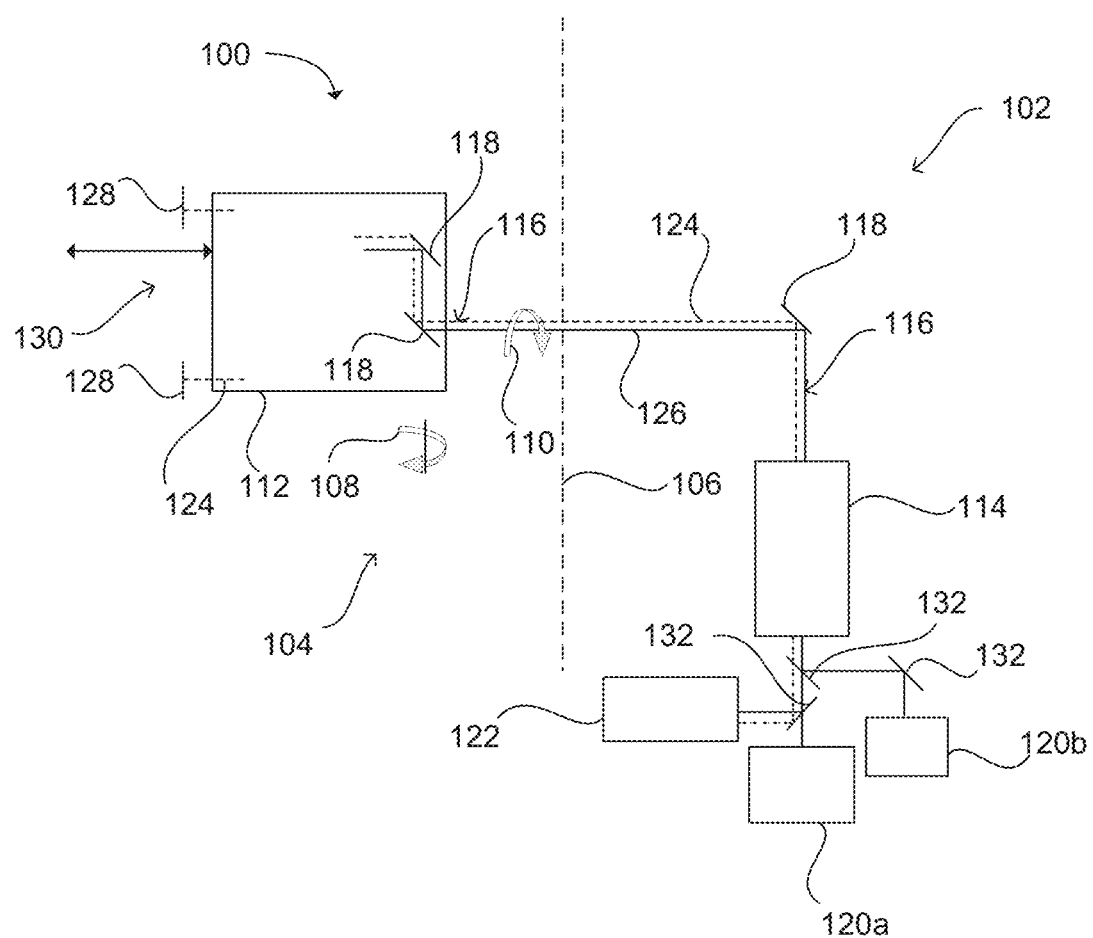
FIG. 1 is a block diagram of an optical sensor comprising a jitter stabilization system comprising a mirror in the form of a diffraction grating in accordance with an example of the subject technology.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

The subject technology provides a solution to the limitation in conventional optical sensors or optical sensor systems using a flat, planar reflective return mirror where the desired pointing motion of an imager optic and FPA results in a reflected and returned jitter signal outside a FOV of a position sensor of a jitter stabilization system. In an example of the disclosure, a jitter signal return component in the form of a diffraction grating can be used to replace the planar reflective return mirror to provide useful jitter signal return to the jitter stabilization system even when the desired pointing motion of an imager optic and FPA is relatively large (with "relatively large" meaning large enough such that the pointing motion of the imager optic and FPA would result in a reflected jitter signal outside a FOV of the position sensor of the jitter stabilization system in the event a planar mirror is utilized within the optical sensor or optical sensor system (i.e., as compared with an optical sensor/system utilizing a planar mirror)).

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

According to one example of the subject disclosure, an optical sensor can comprise afocal foreoptics configured to receive an image signal, an imager optic operable to focus the image signal, at least one focal plane array (FPA) configured to detect the image signal as received along an optical path extending through the imager optic between the at least one FPA and the afocal foreoptics, and a jitter stabilization system. The jitter stabilization system can comprise a transmitter configured to transmit a jitter source signal (i.e., jitter source beam (photon beam)) to the afocal foreoptics and a position sensor configured to receive a jitter return signal (i.e., jitter return beam (photon beam)). The position sensor can be positioned at a shared focus with the at least one FPA.

The optical sensor can further comprise a diffraction grating positioned to receive the jitter source signal. The diffraction grating can be operable to reflect and diffract the jitter source signal, at least a portion or component of which can comprise the return jitter signal to be received by the position sensor. The jitter return signal received at the position sensor can comprise at least a portion of the reflected and diffracted jitter source signal.

In one example, the diffraction grating can comprise an unblazed diffraction grating. The diffraction grating can be a two-dimensional grating. The two-dimensional grating can comprise two unblazed gratings oriented orthogonal to each other. The two unblazed gratings can produce a regular, two-dimensional array of grating outputs for all orders.

In some examples, the position sensor can comprise a jitter sensing FPA operable to detect the jitter return signal. The jitter sensing FPA can be operable to process a window of pixels based on an expected position of the jitter return signal on the jitter sensing FPA.

In some examples, the diffraction grating can be operable to diffract the jitter source signal into a plurality of orders (component signals), at least some of which can be reflected back to the jitter sensing FPA as the jitter return signals. Indeed, the jitter return signal(s) can comprise at least one of the plurality of orders. The plurality of orders can comprise a zero-order mode and a plurality of non-zero-order modes. The at least one of the plurality of orders in the jitter return signal can comprise one of the plurality of non-zero-order modes. The jitter return signal can be transmitted to the position sensor via the optical path. The jitter source signal can be transmitted to the afocal foreoptics along at least a portion of the optical path.

In another example of the subject technology, a method of measuring jitter within an optical sensor is provided. The method can comprise receiving an image signal at an afocal foreoptics assembly of the optical sensor, focusing the image signal via an imager optic, and detecting the image signal with at least one focal plane array (FPA). The image signal can be transferred to the at least one FPA along an optical path extending through the imager optic between the afocal foreoptics assembly and the at least one FPA.

The method can further comprise positioning a jitter stabilization system at a shared focus with the at least one FPA. The jitter stabilization system can include a transmitter configured to transmit a jitter source signal and a position sensor configured to receive at least one jitter return signal.

A diffraction grating can be positioned and supported about, or otherwise associated with, the foreoptics assembly, and the jitter source signal can be transmitted to the diffraction grating via the jitter stabilization system. The method can further comprise reflecting and diffracting the jitter source signal with the diffraction grating and receiving one or more orders of the reflected and diffracted jitter source signal at the jitter stabilization system.

In one example, the jitter source signal can be reflected and diffracted off of an unblazed diffraction grating. In other words, the diffraction grating can comprise an unblazed diffraction grating.

In one example, the jitter source signal can be reflected and diffracted off of a two-dimensional grating. In other words, the diffraction grating can comprise a two-dimensional diffraction grating. The two-dimensional grating can comprise two unblazed gratings oriented orthogonal to each other. The two unblazed gratings can produce a regular, two-dimensional array of grating outputs for all orders.

In some examples, the one or more orders of the reflected and diffracted jitter source signals can be received at a position sensor of the jitter stabilization system. The position sensor can comprise a jitter sensing FPA.

The method can further comprise processing a window (i.e., a subset) of a plurality of pixels of the jitter sensing FPA based on an expected position of the one or more orders of the reflected and diffracted jitter source signals on the jitter sensing FPA.

In some examples, the one or more orders of the reflected and diffracted jitter source signal received at the jitter stabilization system can comprise a non-zero-order mode. The one or more orders of the reflected and diffracted jitter source signal received at the jitter stabilization system can be transmitted via the optical path. The jitter source signal can be transmitted to the afocal foreoptics along at least a portion of the optical path.

In another example of the subject technology, an optical sensor system can comprise afocal foreoptics configured to receive an image signal, an imager optic operable to focus the image signal, at least one focal plane array (FPA) configured to detect the image signal as received along an optical path extending through the imager optic between the at least one FPA and the afocal foreoptics, a diffraction grating positioned and supported about or otherwise associated with the afocal foreoptics, and a jitter stabilization system. The jitter stabilization system can comprise a transmitter configured to transmit a jitter source signal to the diffraction grating and a position sensor (e.g., a jitter sensing FPA) configured to receive a jitter return signal. The position sensor (e.g., jitter sensing FPA) can be positioned at a shared focus with the at least one FPA. The system can further comprise one or more processors and a memory device operatively coupled to the one or more processors and storing instructions that, when executed by the one or more processors, cause the system to process signals received from the position sensor upon the position sensor receiving the jitter return signal to determine the position of the jitter return signal over time to facilitate measurement of jitter in the optical sensor. The position sensor can comprise a jitter sensing FPA, and the memory device can further comprise instructions that, when executed by the one or more processors, cause the system to define a subset of pixels of a plurality of pixels of the jitter sensing FPA based on an expected position of the jitter return signal on the jitter sensing FPA, and process signals received from the jitter sensing FPA upon the jitter sensing FPA receiving the jitter return signal within the subset of pixels to determine the position of the jitter return signal over time to facilitate measurement of jitter in the optical sensor (as described below in FIGS. 1, 5B and 6).

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts.

Referring now to FIG. 1, a block diagram of an optical sensor 100 in accordance with the subject technology is shown. The optical sensor 100 can be designed to be mounted on a movable body, such as a vehicle, aircraft, space system (e.g., satellite), or the like. To that end, the optical sensor 100 can include a first subsystem 102 which is mounted and fixed on the movable body. A second subsystem 104 can be divided from the first subsystem 102 by a gimbal (e.g. arranged at dividing line 106), which can define a pivot point between the subsystems 102, 104. The gimbal can allow the second subsystem 104 to rotate, with respect to the first subsystem 102, around one or more gimbal axes 108, 110. In the example shown, the second subsystem 104 can rotate in a first direction around a first gimbal axis 108 which allows for scanning in an elevation direction. The second subsystem 104 can also rotate in a second direction around a second gimbal axis 110 which allows for scanning in an azimuth direction.

The optical sensor 100 can include afocal foreoptics (afocal foreoptics assembly) 112 and a relayed passive imager optic 114. Optical signals within the optical sensor 100 can be directed along an optical path 116 that extends through the imager optic 114 between the afocal foreoptics 112 and the FPA(s) 120. Optical signals can be guided along the optical path 116 by a number of reflective mirrors 118 in the afocal foreoptics 112. The reflective mirrors 118 can define and facilitate the optical path 116 with reflective optical elements, such as reflective metal surfaces. In one non-limiting example, no powered lenses can be required, and the optical path 116 can be defined only by the reflective optical elements.

The imager optic 114 can be a focal system which is configured to form an image on a number of image detectors at a shared focus of the imager optic 114 based on an image signal 126. In the exemplary optical sensor 100, the image detectors can include an infrared (IR) focal plane array (FPA) 120a and a visible light FPA 120b, although it should be understood that other FPAs, or other detectors, can also be included. Further, a single FPA, such as only the visible light FPA 120b can be included. Thus, the number and type of FPAs used in the optical sensor 100 is not limited in any way by the example shown in FIG. 1. Generally, the FPAs 120a, 120b (generally FPA(s) 120) can be passive FPAs that record a scene image.

The optical sensor 100 can also include a jitter stabilization system 122, which can be located at the shared focus of the imager optic 114. The jitter stabilization system 122 can include one or more transmitters configured to transmit a jitter source signal 124 along an optical beam offset from the optical path 116, and one or more position sensors configured to detect a jitter return signal (i.e., jitter return beam (photon beam)), such as one returning with the image signal 126. Several dichroic beam splitters 132 can convey optical signals from the imager optic 114 between the FPA(s) 120 and/or the jitter stabilization system 122. In some examples, transmitters configured to transmit a jitter source signal 124 can be positioned remote from the jitter stabilization system 122, such as adjacent to one or more of the FPA(s) 120. Since the total angular departure of a jitter measurement beam is modest compared to the sensor field of view, the position sensor can be sized much smaller than the size of the FPAs 120. Due to the reflective optical path 116, the optical sensor 100 has no wavelength restrictions on the optical signals 124, 126. Jitter source and position sensor can both be chosen for availability, low cost, and peak performance.

The optical sensor 100 can be configured such that the jitter source signal 124 will sample (i.e., touch) every reflective surface 118 within the optical path 116 as it is emitted from the jitter stabilization system 122. The jitter source signal 124 can be conveyed adjacent the optical path 116 by an optical beam. At or adjacent to the afocal foreoptics 112, the jitter source signal 124 can contact, and one or more components or orders of the jitter source signal 124 can be returned by, one or more diffraction gratings 128 as part of the jitter stabilization system 122. As will be discussed in more detail, the one or more diffraction gratings 128 can reflect and diffract the transmitted jitter source signal 124 to generate multiple orders of the jitter source signal 124, one or more of which can be returned as a returning jitter signal or jitter return signal back along the optical path 116 along with the image signal 126, to be received on the position sensor of the jitter stabilization system 122, such as via the reflective surfaces 118 defining the optical path 116. This allows the jitter signal (comprising the jitter source signal 124 and the jitter return signal) to make a double pass through the optical path 116 of the optical sensor 100 (e.g., the jitter source signal 124 in one direction and the jitter return signal in the other direction) to ensure that any jitter present in the optical sensor 100 can be detected along each portion of the optical path 116. It should be understood that the source of the transmitted jitter source signal can have several forms. It can be a small emitting source, such as an LED or the like. Or the source can be the output of a small diameter optical fiber, the input to which is a remotely located source, again such as an LED or the like.

This arrangement yields a number of advantages. By positioning the jitter stabilization system 122 at the shared focus conjugate to the FPAs 120 and using a diffraction grating 128 at or adjacent to the afocal foreoptics 112 and an imaging aperture 130, the jitter source signal 124 is able to traverse the optical beam adjacent the optical path 116, and the jitter return signal is able to traverse the optical path 116, sampling every surface 118 touched by optical signals 126. This results in a jitter measurement that more accurately tracks actual jitter error being experienced in the optical signals 126 being imaged onto the FPAs 120, including capturing any error brought on by gimbal movements. As discussed below, the jitter measurement can then be utilized to make adjustments to the scene image being recorded by the FPA(s) 120.

Further, through the use of the diffraction grating 128, the transmitted jitter source signal 124 can reliably be reflected and diffracted to generate a jitter return signal that is returned along the optical path 116 of the optical sensor 100 to be detected by the position sensor of the jitter stabilization system 122. In some applications, the optical sensor 100 can point a smaller imager optic and FPA field of view within a larger afocal foreoptics field of view. In conventional optical sensors, as discussed above, if a flat, reflective return mirror is used to reflect a transmitted jitter source signal, the reflected jitter signal (i.e., return jitter signal) can return outside of the imager optic and FPA field of view. This would result in no jitter signal being returned to a jitter stabilization system operable with the conventional optical sensor or optical sensor system. Thus, when a flat, reflective return mirror is used to reflect the jitter signal, the pointing ability of an imager optic and FPA field of view can be limited. Unlike conventional optical sensors or sensor systems, the optical sensor 100 discussed and set forth herein comprises one or more jitter signal return components in the form of one or more diffraction gratings 128, which one or more diffraction gratings 128 operate and function to facilitate a return jitter signal being returned within the imager optic 114 and FPA(s) 120 FOV, and thus returned to the jitter stabilization system 122 under similar conditions that would normally not be if a conventional flat, reflective return mirror were utilized within a conventional optical system.

Figure 2A:
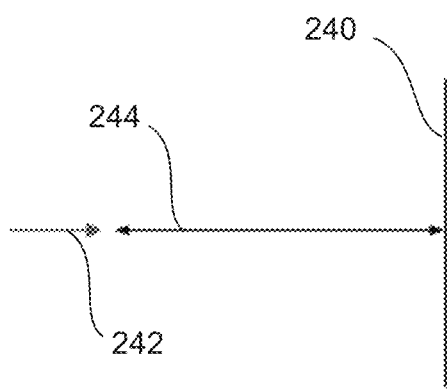
FIGS. 2A and 2B show a schematic of a jitter source signal being reflected by a conventional flat or planar reflective return mirror.
Figure 2B:
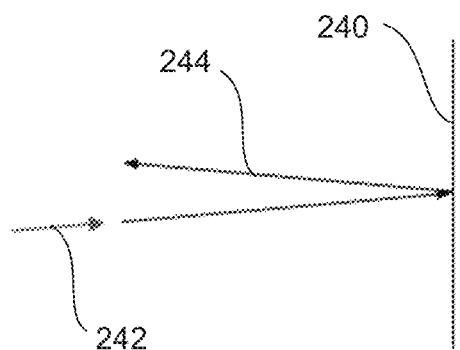

For example, FIGS. 2A and 2B show schematic drawings of a jitter source signal being reflected by a conventional flat or planar reflective return mirror within a conventional optical sensor/system, with the jitter source signal being incident on the flat reflective return mirror at different angles. In FIG. 2A, a jitter source signal 242 is directed straight on towards a flat return mirror 240. That is, the jitter source signal 242 is directed at an angle substantially orthogonal with respect to a reflective surface of the flat return mirror 240, such that the incidence angle of the jitter source signal 242 on the flat return mirror 240 is zero degrees (0°). The flat return mirror 240 reflects the jitter source signal 242 such that a reflected jitter signal 244 is returned off of the flat return mirror 240. It is noted herein that a "reflected jitter signal" is not necessarily a "jitter return signal" unless it is received by the position sensor of a jitter stabilization system and within the FOV of an imager optic and FPA). In this case, the reflected jitter signal 244 is returned on a same axis as the jitter source signal 242. Thus, within an optical sensor, the reflected jitter signal 244 returns within a field of view of the imager optic and FPA, and thus functions and operates as a jitter return signal that can be used to correct image jitter.

In FIG. 2B, the jitter source signal 242 is directed onto the flat return mirror 240 at an angle offset from an angle orthogonal to the flat return mirror 240. For example, the jitter source signal 242 can be directed at an angle of incidence as measured offset from an angle orthogonal to the mirror 240 by five degrees (5°). This offset causes the reflected jitter signal 244 reflected from the flat return mirror 240 to also be returned at an angle offset from the axis of the jitter source signal. Continuing the example from above, when the jitter source signal 242 is offset five degrees from orthogonal, the reflected jitter signal 244 can deviate or be offset from the jitter source signal 242 by ten degrees. In some applications, this deviation can be outside the field of view of the imager optic and FPA of a conventional optical sensor. In this case, the reflected jitter signal 244 does not function as a return jitter signal as it is not able to be received by any sensor of any type of jitter stabilization system. Thus, the ability to point an imager optic and FPA field of view can be limited in some applications by an ability to detect a jitter return signal from the reflected jitter signal 244 when a flat mirror is used to reflect the jitter source signal.

As mentioned above in connection with FIG. 1, the optical sensor 100 can comprise a diffraction grating 128 (or multiple diffraction gratings 128) that reflects and diffracts the jitter source signal 124 to provide a reflected and diffracted jitter signal that can function as a jitter return signal to be received by the jitter stabilization system 122 and utilized to correct and control image jitter. As will be apparent to those skilled in the art, a diffraction grating is an optical component with a periodic structure that splits and diffracts a source light beam or signal into several reflected component signals or beams travelling in different directions. A diffraction grating has a zero-order mode where there is no diffraction, and where a ray of light or signal behaves as if it was reflected off of a flat reflective mirror. However, unlike a flat reflective mirror, a diffraction grating can also generate multiple non-zero-order modes or diffracted orders (i.e., components of light beams or signals as diffracted from the incoming source beam or signal) formed with the diffraction grating on both sides of the zero-order mode.

The optical sensor (such as optical sensor 100 in FIG. 1) can take advantage of the multiple diffracted orders created by the diffraction grating(s) 128 to ensure that at least a portion of the reflected and diffracted jitter signal is returned as a jitter return signal within a field of view of the imager optic 114 and FPA(s) 120. In other words, the jitter return signal received at the position sensor of the jitter stabilization system 122 comprises at least a portion of the reflected and diffracted jitter signal (e.g., a zero-order mode if the entire reflected and diffracted jitter signal is received at the position sensor of the jitter stabilization system 122, and/or a non-zero-order mode (i.e., a diffracted order) if a portion of the reflected and diffracted jitter signal is received at the position sensor). Specifically, even when the diffraction grating(s) 128 is/are oriented such that a reflection of the jitter source signal 124 at the zero-order mode would be outside a field of view of the imager optic 114 and the FPA(s) 120, one or more other diffracted non-zero-order modes reflected from the diffraction grating can still be within the field of view of the imager optic 114 and FPA(s) 120 and function as a return jitter signal. Thus, the pointing ability of the imager optic 114 and FPA(s) 120 of the optical sensor 100 is not restricted by the ability to only detect the zero-order jitter return signal as is the case with conventional optical sensors using a flat reflective return mirror.

Figure 3A:
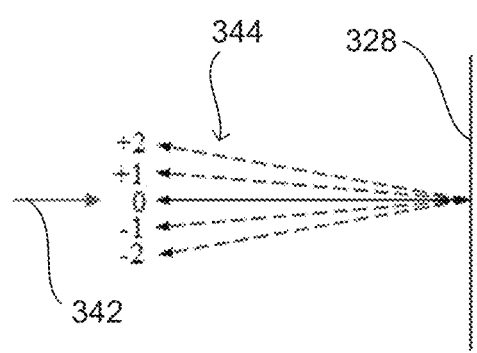
FIGS. 3A and 3B show schematics of a jitter source signal being reflected and diffracted by a diffraction grating, such as the diffraction grating of the optical sensor of FIG. 1.
Figure 3B:
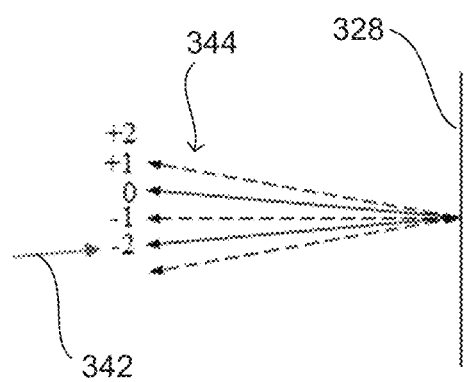

An example of this is shown in connection with FIGS. 3A and 3B. FIGS. 3A and 3B show two schematic drawings of a jitter source signal 342 being reflected by a diffraction grating 328. In FIG. 3A, the jitter source signal 342 is directed substantially orthogonal towards the diffraction grating 328 (zero degree angle of incidence). The diffraction grating 328 reflects and diffracts the jitter source signal 342 such that a plurality of orders, including the zero-order mode and various non-zero-order modes, are reflected from the diffraction grating 328 as reflected and diffracted jitter signals 344. In FIG. 3A, the jitter source signal 342 is directed onto the diffraction grating 328 at a zero incidence angle orthogonal to the diffraction grating 328. Thus, the zero-order mode is reflected back along an axis of the jitter source signal 342, and the zero-order mode is within a field of view of an imager optic and FPA(s) of an optical sensor (e.g., the imager optic 114 and FPA(s) of the optical sensor 100 of FIG. 1), thus comprising a detectable and usable jitter return signal.

In FIG. 3B, the jitter source signal 342 is directed onto the diffraction grating 328 at an angle offset from an angle orthogonal to the diffraction grating 328. For example, the jitter source signal 342 can comprise an incidence angle offset from an angle orthogonal to the diffraction grating 328 by five degrees. With the use of the diffraction grating 328, the reflected and diffracted jitter signal 344 is diffracted into a plurality of orders, including a zero-order mode and a plurality of non-zero-order modes on each side of the zero-order mode. In the example show in FIG. 3B, the zero-order mode (which behaves similar to a normal reflection off a flat mirror) is offset from the jitter source signal 342 by ten degrees. Thus, in some applications, the zero-order mode can be outside the field of view of an imager optic and FPA of an optical sensor, thus not being able to function as a detectable and usable jitter return signal. However, because the reflected and diffracted jitter signal 344 includes multiple non-zero-order modes, at least one of the multiple non-zero-order modes can still be within a field of view of an imager optic and FPA of an optical sensor, and thus can function as a jitter return signal received on the position sensor of the jitter stabilization system, and processed and utilized to control and correct image jitter. In the example shown in FIG. 3B, the −2 order of the reflected and diffracted jitter signal 344 is reflected back along the axis of the jitter source signal 342, or back towards and within a field of view of an imager optic and FPA of an optical sensor (e.g., the imager optic 114 and FPA(s) 120 of the optical sensor 100 of FIG. 1 discussed above), thus functioning as a detectable and usable jitter return signal. Other orders of the reflected and diffracted jitter signal 344 that are not necessarily reflected back along the axis of the jitter source signal 342 may also be reflected back and within the FOV of the imager optic and FPA. These can also function as detectable and usable jitter return signals. As can be seen, an imager optic and FPA can be pointed without the restrictions that are caused by a reflected jitter signal failing to be within the field of view when using a flat reflective return mirror of a conventional optical sensor to reflect the jitter source signal.

Any suitable reflective diffraction grating can be used as the diffraction grating 128/328 in an optical sensor, such as the optical sensor 100 discussed above. In one example, the diffraction grating 128/328 can comprise an unblazed diffraction grating. A blazed diffraction grating is a grating optimized for maximum efficiency in a desired order while minimizing residual power in other orders. In other words, a blazed grating seeks to concentrate the output energy into just one order. On the other hand, an unblazed diffraction grating is not optimized for any particular order, and thus diffracts multiple different orders of the same output energy. In other words, an unblazed diffraction grating has a symmetric groove profile and the output energy goes into all of the orders. In the present application, the use of an unblazed diffraction grating provides for multiple orders including the zero-order mode and non-zero-order modes to be reflected from the diffraction grating. This provides for multiple possible orders being aligned with a field of view of an imager optic and FPA of an optical sensor.

Figure 4A:
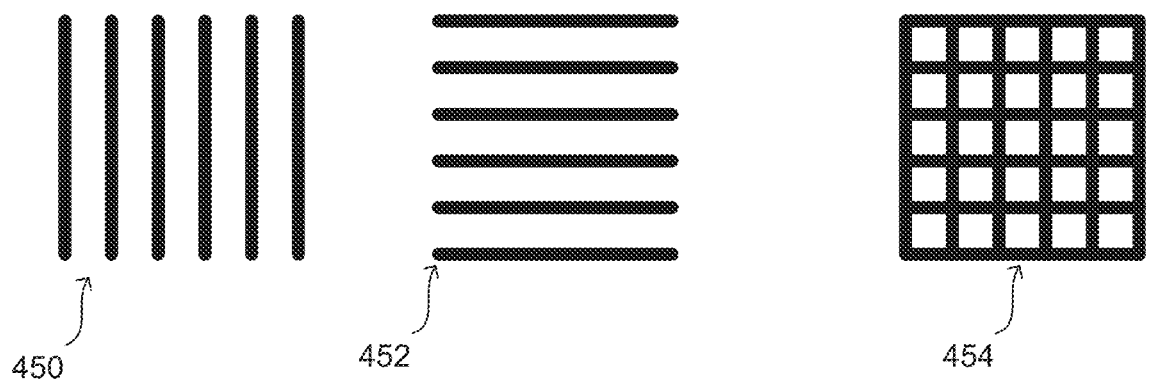
FIG. 4A shows a schematic example of a diffraction grating for use with the optical sensor of FIG. 1.
Figure 4B:
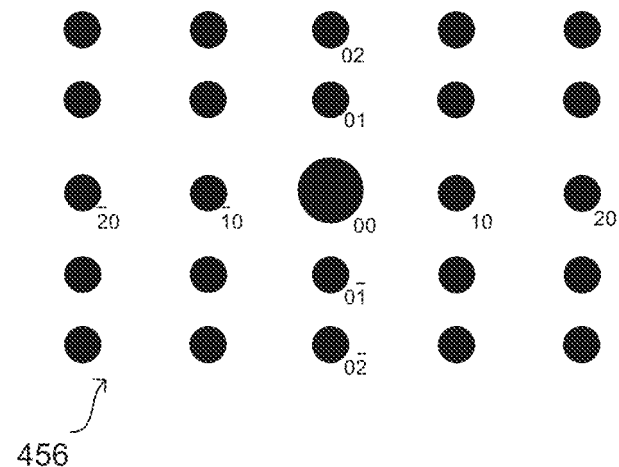
FIG. 4B shows a schematic example of an array of orders of a reflected and diffracted jitter source signal created by the diffraction grating shown in FIG. 4A.

A schematic example of a specific configuration or type of a diffraction grating, which the diffraction gratings 128/328 can be based on, for use with an optical sensor, including, but not limited to the optical sensor 100, is shown in FIG. 4A, and a schematic example of an array of resulting reflected and diffracted orders is shown in FIG. 4B. In FIG. 4A, a first grating 450 is shown schematically. The first grating 450 can be configured to diffract orders in a first direction with the orders, or grooves forming the orders, having a first grating period (i.e., spacing). A second grating 452 is shown schematically and can be configured to diffract orders in a second direction with the orders having a second grating period. In this example, the second direction can be orthogonal to the first direction. However, it will be apparent to those skilled in the art that the directions of orders created by the first and second gratings can be any desired direction. Further, the periods or spacing between the orders in each of the first and second gratings can be any desired period.

The first grating 450 and the second grating 452 can be overlaid on one another to form a two-dimensional grating, in this example a two-dimensional crossed grating 454. In this example, the crossed grating 454 refers to a grating operable to generate an array of reflected orders in directions orthogonal to each other. However, other directions and configurations can also be used such as directions that are not orthogonal to one another. The first and second gratings 450 and 452 can further comprise unblazed gratings that produce a regular, two-dimensional array of orders.

The crossed grating 454 can reflect and diffract an array of orders 456 as shown in FIG. 4B. The array of orders 456 can include a zero-order mode indicated at position 00. Other orders are shown based on a relative position from the zero-order mode. In this example, the array of orders 456 is formed from orders extending in directions orthogonal to one another creating a regular, two-dimensional array. In some examples, a period between orders in one direction can be different than a period between orders in the other direction. In other examples, the period between orders can be the same in each direction.

As applied to an optical sensor, such as optical sensor 100 in FIG. 1, a two-dimensional diffraction grating, such as the crossed grating 454, provides orders in two directions, which can be two orthogonal directions, from the zero order mode. Thus, when an imager optic and FPA are pointed in different directions within a larger field of view of an afocal foreoptics assembly, the array of orders 456 reflected and diffracted by the two-dimensional crossed grating 454 allows for different orders to still be within a field of view of the imager optic and FPA.

Referring again to FIG. 1, the jitter stabilization system 122 includes a position sensor that detects the jitter return signal. As indicated above, in some instances, it is possible that more than one of the orders generated by the diffraction grating (such as diffraction grating 128/328 of FIGS. 1 and 3A-3B) is within a field of view of the imager optic 114 and FPA(s) 120. In this case, more than one jitter return signal can be received by the position sensor of the jitter stabilization system 122. In some jitter detection algorithms, the detection of more than one jitter signal poses no problem to the jitter stabilization system 122. However, in some jitter detection algorithms, the detection of multiple jitter signals can pose a problem in processing the jitter return signal.

Figure 5A:
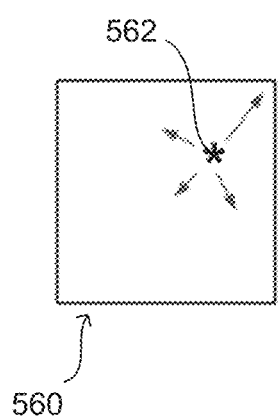
FIGS. 5A and 5B show schematic examples of a position sensor as part of a jitter stabilization system.
Figure 5B:
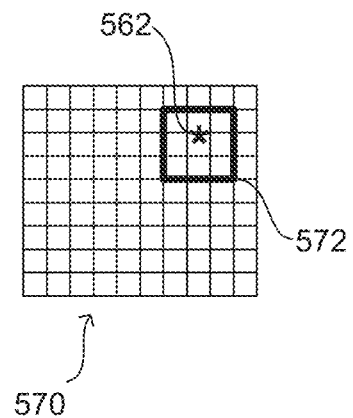

FIGS. 5A and 5B show schematic examples of a position sensor for use with a jitter stabilization system, such as, but not limited to, the jitter stabilization system 122 of FIG. 1. FIG. 5A shows a position sensor that can be a position sensing detector or a position sensitive silicon detector (PSD) which has an electrode at each of four corners so that the incident position of the photo electrons from the jitter return signal can be obtained using signals from the electrodes. As shown in FIG. 5A, a signal, such as a jitter return signal 562 can be received at the position sensor 560. By using the electrodes at each corner of the position sensor 560, the position and change of position of the signal 562 can be measured. In this manner, an amount of jitter over given time periods can be measured by the position sensor 560.

FIG. 5B shows a position sensor 570 that can be a focal plane array (FPA) with a plurality of pixels. In other words, the position sensor 570 can comprise a jitter return signal sensing FPA having multiple pixels that can be interrogated (processed) upon a jitter return signal being detected. The FPA can be operable to detect a position and a change of position of a signal, such as a jitter return signal, based on which pixels on the FPA detect the jitter return signal. As shown in FIG. 5A, a signal, such as jitter return signal 562 can be received at the position sensor 570. By using the individual pixels of the position sensor 570, the position and change of position of the jitter return signal 562 can be measured. In this manner, an amount of jitter over given time periods can be measured by the position sensor 570.

In an event that multiple jitter return signals from a diffraction grating detected at a position sensor poses a problem to a jitter detection algorithm, an optical sensor with a jitter stabilization system can utilize a focal plane array such as position sensor 570 to detect and measure jitter in the optical sensor. An expected position on the position sensor of one or more orders (one or more jitter return signals) of the diffracted and reflected jitter signals that are reflected by the diffraction grating is known based on the position of the diffraction grating and on the direction that an imager optic and FPA field of view of an optical sensor are pointing. Based on the expected position of the one or more orders on the position sensor, the jitter stabilization system can utilize windowing on the FPA of the position sensor. Windowing in this instance comprises defining one or more pixels on the FPA of the position sensor 570 to process (i.e., defining a subset of pixels of the plurality of pixels on the FPA of the position sensor 570) while ignoring remaining pixels. For example, in FIG. 5B, a window 572 is shown outlining some of the pixels of the position sensor 570. The particular pixels within the window 572 in FIG. 5B is merely exemplary, and the window 572 could be configured to be larger, smaller, and/or at a different position on the position sensor 570. The pixels within the window 572 can be chosen based on an expected position of a jitter return signal on the position sensor 570. The jitter stabilization system can be operable to process only the subset of pixels within the window 572 to determine the position of the jitter return signal over time to measure the jitter in an optical sensor. In the event that another order (one or more other jitter return signals) of the reflected and diffracted jitter signals are returned and received by the position sensor 570 outside the designated window 572 of pixels, the signal or signals is/are ignored due to the jitter stabilization system being configured to not process any signals incident on the pixels of the position sensor outside the window 572.

Figure 6:
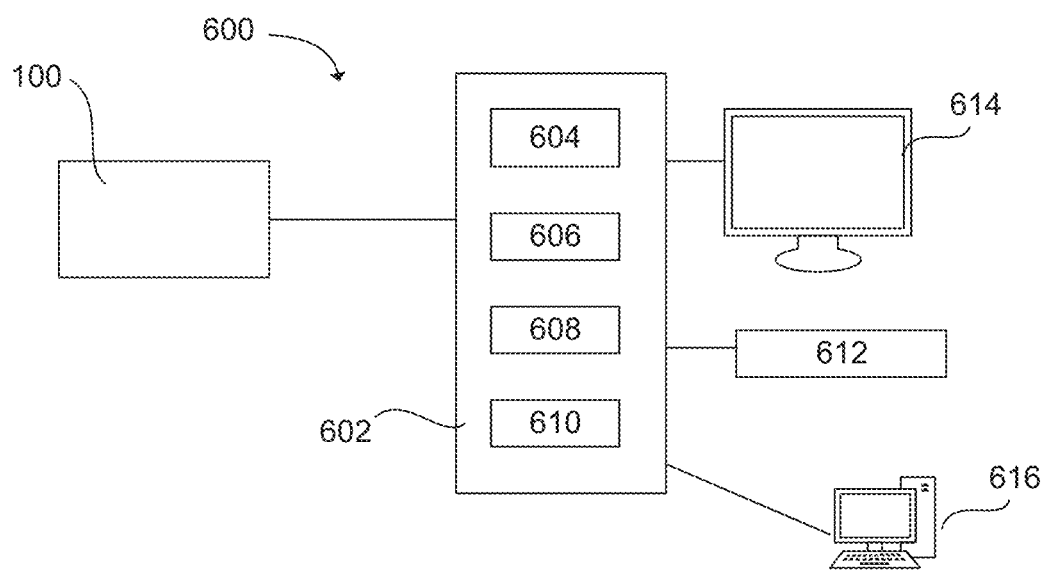
FIG. 6 shows a schematic of an optical sensor system.

The windowing process on a FPA as a position sensor in a jitter stabilization system can be controlled via software. FIG. 6 shows a schematic of an exemplary optical sensor system. With reference to FIGS. 1 and 6, an optical sensor system 600 can comprise the optical sensor 100, and thus the discussion above can be incorporated here. The optical sensor 100 can be communicatively connected to a control device 602. In this example, the control device 602 is shown separate from the optical sensor 100, however, this is not intended to be limiting. The control device 602 can also be incorporated into the optical sensor 100. For example, the control device 602 can be incorporated within the jitter stabilization system 122 (see FIG. 1) or elsewhere in the optical sensor 100.

The control device 602 can be a computing device such as a personal computer, a mobile phone, a tablet computer, or other computing device. The control device 602 can also be a computing device integrated with another device, such as the optical sensor 100 or as part of another computing system or control device. The control device 602 can comprise one or more computer processors (e.g., see processor 604) operable with one or more memory storage devices (e.g., see memory 606). The memory 606 can store programming instructions which are executable by the processor 640 to operate the control device 602 and to cause the system to perform a variety of functions. The programming instructions can comprise instructions for controlling various features of the optical sensor 100, such as to control the jitter stabilization system 122 including a position sensor, such as the position sensors 560 and/or 570 shown in FIGS. 5A and 5B, respectively.

The control device 602 can further comprise a transceiver 608 configured to send and receive information from one or more other devices via a wired or a wireless connection. For example, the transceiver 608 can be operable to send instructions to the optical sensor 100 or to other external devices and to receive information from the optical sensor 100 such as imaging information or jitter stabilization information. The control device 602 can also comprise a power system 610 which can receive power from an external power supply or which can comprise a battery and a charge controller to provide power to the control device 602.

The control device 602 can connect to one or more peripheral devices such as a monitor 614. The monitor 614 can be any convention monitor such as an LCD or LED monitor and can optionally comprise a touchscreen to input data to the control device 602. The control device 602 can further comprise one or more interface devices 612 for inputting and outputting information to and from the control device 602 such as a keyboard, mouse, printer, external storage device, or the like. The control device 602 can also connect to one or more other computing devices 616 such as a database or server device. The control device 602 can be connected to the computing device(s) 616 via a wired or wireless connection, such as a local network or via the Internet.

The control device 602 can be operable to control the optical sensor 100 including a position sensor, such as one similar to position sensor 570 of FIG. 5B. As mentioned above, the position sensor 570 can be incorporated into the jitter stabilization system 122 as shown in FIG. 1. With reference to FIGS. 1, 5B and 6, the control device 602 can be operable to activate a window 572 of pixels of the sensor 570 based on a pointing direction of an imager optic and FPA FOV of the optical sensor 100. Based on the pointing direction of the imager optic and FPA FOV, an expected return position of a jitter return signal on the sensor 570 can be known. Accordingly, the window 572 of pixels on the sensor that are activated by the control device 602 can be based on the expected position of the jitter return signal on the sensor 570.

It is noted that the windowing capabilities of the position sensor 570 and optical sensor system 600 can be beneficial even if only a singer jitter signal is received by the position sensor 572. By using the windowing capabilities on the position sensor 570, the bandwidth of the sensor 570 can be enhanced because fewer pixels of the position sensor 570 need to be processed to measure the jitter. Thus, the position sensor 570 can process quicker and more efficiently.

Figure 7:
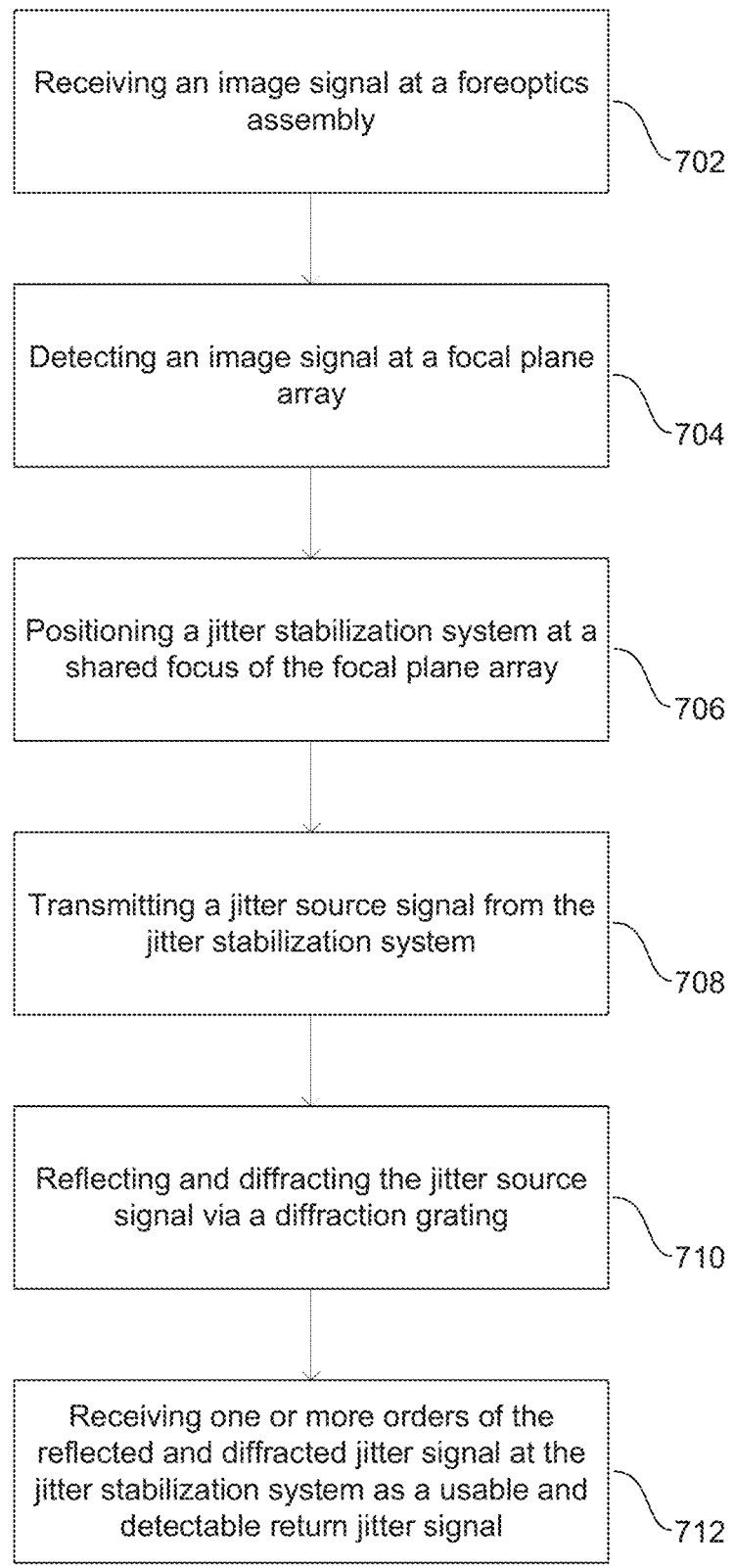
FIG. 7 shows an exemplary method of detecting jitter.

FIG. 7 shows an exemplary method of detecting jitter. The method can be implemented using an optical sensor, such as the optical sensor 100 described herein. However, the method is not limited to the optical sensor 100. Further, the steps outlined in FIG. 7 are not necessarily required to be performed in the order presented. In step 702, an image signal is received at afocal foreoptics. For example, with reference to FIG. 1, an image signal can be received at the afocal foreoptics 112.

In step 704, the image signal received at the afocal foreoptics can be detected at an FPA. For example, with reference to FIG. 1, an image signal can be transmitted along an optical path 116 of the optical sensor 100 to one or more FPAs 120. In one example, the FPA(s) 120 can be positioned at a shared focus of the imager optic 114 at an end of the optical path 116.

In step 706, a jitter stabilization system can be positioned at the shared focus with the FPA(s). For example with reference to FIG. 1, the jitter stabilization system 122 can be positioned at a shared focus with the FPA(s) 120. The jitter stabilization system 122 can be operable to transmit a jitter source signal (e.g., see jitter source signal 124 of FIG. 1) and to receive a reflected and diffracted jitter signal as explained above (see reflected and diffracted jitter signals 344 of FIGS. 3A and 3B). In step 708, the jitter stabilization system can transmit a jitter source signal. For example with reference to FIG. 1, the jitter stabilization system can transmit a jitter source signal 124 along or adjacent to the optical path 116.

In step 710, the jitter source signal transmitted from the jitter stabilization system can be reflected and diffracted via a diffraction grating. For example with reference to FIG. 1, the jitter source signal 124 can be reflected and diffracted by the diffraction gratings 128. The diffraction gratings 128 can be positioned adjacent to the afocal foreoptics 112 as shown in FIG. 1. As explained above, one or more reflective diffraction gratings, such as diffraction gratings 128, can allow an imager optic and FPA FOV to be pointed in several different directions within a larger afocal foreoptics FOV. The imager optic and FPA can be pointed in a direction, such that multiple orders of the jitter source signal are reflected off of the diffraction gratings 128 as reflected and diffracted jitter signals that are reflected at different or various angles. At least one of the orders can be received on a position sensor of the jitter stabilization system, and can thus be a detectable and usable jitter return signal.

In step 712, one or more orders of the diffracted jitter source signal (i.e., one or more reflected and diffracted jitter signals) can be received at the jitter stabilization system. As explained above, the diffraction grating enables one or more orders from the reflected and diffracted jitter signals to be within a FOV of the jitter stabilization system. Thus, the jitter stabilization system is able to detect and measure jitter even when the imager optic and FOV of the optical sensor is pointed in different directions.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An optical sensor comprising:
foreoptics configured to receive an image signal;
an imager optic operable to focus the image signal;
at least one focal plane array (FPA) configured to detect the image signal as received along an optical path extending through the imager optic between the at least one FPA and the foreoptics;
a jitter stabilization system comprising a transmitter configured to transmit a jitter source signal to the foreoptics and a position sensor configured to receive a jitter return signal, the position sensor positioned at a shared focus with the at least one FPA; and
a diffraction grating configured and positioned to receive the jitter source signal, the diffraction grating being operable to reflect and diffract the jitter source signal, wherein the jitter return signal received at the position sensor comprises at least a portion of the reflected and diffracted jitter source signal.

2. The optical sensor of claim 1, wherein the diffraction grating comprises an unblazed diffraction grating.

3. The optical sensor of claim 1, wherein the diffraction grating comprises a two-dimensional grating.

4. The optical sensor of claim 3, wherein the two-dimensional grating comprises two unblazed gratings oriented orthogonal to each other.

5. The optical sensor of claim 4, wherein the two unblazed gratings produce a regular, two-dimensional array of orders.

6. The optical sensor of claim 1, wherein the position sensor comprises a jitter sensing FPA operable to detect the jitter return signal.

7. The optical sensor of claim 6, wherein the jitter sensing FPA is operable to process a window of pixels based on an expected position of the jitter return signal on the jitter sensing FPA.

8. The optical sensor of claim 1, wherein the diffraction grating is operable to diffract the jitter source signal into a plurality of orders, and wherein the jitter return signal comprises at least one of the plurality of orders.

9. The optical sensor of claim 8, wherein the plurality of orders comprises a zero-order mode and a plurality of non-zero-order modes, and wherein the at least one of the plurality of orders comprises one of the plurality of non-zero-order modes.

10. The optical sensor of claim 1, wherein the jitter return signal is transmitted to the position sensor via the optical path.

11. The optical sensor of claim 10, wherein the jitter source signal is transmitted to the foreoptics along at least a portion of the optical path.

12. A method of measuring jitter within an optical sensor comprising:
receiving an image signal at a foreoptics assembly of an optical sensor;
focusing the image signal via an imager optic;

detecting the image signal with at least one focal plane array (FPA), the image signal being transferred to the at least one FPA along an optical path extending through the imager optic between the foreoptics assembly and the at least one FPA;

positioning a jitter stabilization system at a shared focus with the at least one FPA, the jitter stabilization system including a transmitter configured to transmit a jitter source signal and a position sensor configured to receive a jitter return signal;

associating a diffraction grating with the foreoptics assembly;

transmitting the jitter source signal via the jitter stabilization system to the diffraction grating;

reflecting and diffracting the jitter source signal with the diffraction grating; and receiving one or more orders of the reflected and diffracted jitter source signal at the jitter stabilization system.

13. The method of claim 12, wherein the diffraction grating comprises an unblazed diffraction grating.

14. The method of claim 12, wherein the diffraction grating comprises a two-dimensional diffraction grating.

15. The method of claim 14, wherein the two-dimensional grating comprises two unblazed gratings oriented orthogonal to each other.

16. The method of claim 15, wherein the two unblazed gratings produce a two-dimensional array of orders.

17. The method of claim 12, wherein the position sensor comprises a jitter sensing FPA.

18. The method of claim 17, further comprising processing a window of pixels of the jitter sensing FPA based on an expected position of the one or more orders of the reflected and diffracted jitter source signal on the jitter sensing FPA.

19. The method of claim 12, wherein the one or more orders of the reflected and diffracted jitter source signal received at the jitter stabilization system comprises a non-zero-order mode.

20. The method of claim 13, wherein the one or more orders of the reflected and diffracted jitter source signal received at the jitter stabilization system are transmitted via the optical path.

21. The method of claim 13, wherein the jitter source signal is transmitted to the foreoptics assembly along at least a portion of the optical path.

22. An optical sensor system comprising:
an optical sensor comprising:
foreoptics configured to receive an image signal;
an imager optic operable to focus the image signal;
at least one focal plane array (FPA) configured to detect the image signal as received along an optical path extending through the imager optic between the at least one FPA and the foreoptics;
a diffraction grating associated with the foreoptics; and
a jitter stabilization system comprising a transmitter configured to transmit a jitter source signal to the diffraction grating and a position sensor configured to receive a jitter return signal the position sensor being positioned at a shared focus with the at least one FPA; and a control device comprising one or more processors and a memory device operatively coupled to the one or more processors and storing instructions that, when executed by the one or more processors, cause the system to:
process signals received from the position sensor upon the position sensor receiving the jitter return signal to determine a position of the jitter return signal over time to facilitate measurement of jitter in the optical sensor.

23. The system of claim 22, wherein the position sensor comprises a jitter sensing FPA, and wherein the memory device further comprises instructions that, when executed by the one or more processors, cause the system to define a subset of pixels of a plurality of pixels of the jitter sensing FPA based on an expected position of the jitter return signal on the jitter sensing FPA, and process signals received from the jitter sensing FPA upon the jitter sensing FPA receiving the jitter return signal within the subset of pixels to determine the position of the jitter return signal over time to facilitate measurement of jitter in the optical sensor.

* * * * *